(12) United States Patent
Sikora et al.

(10) Patent No.: US 10,578,183 B2
(45) Date of Patent: Mar. 3, 2020

(54) TWIN-TUBE HYDRAULIC DAMPER WITH A VIBRATION SUPPRESSING DEVICE

(71) Applicant: BeijingWest Industries Co., Ltd., Beijing (CN)

(72) Inventors: Marian Sikora, Cracow (PL); Witold Palka, Cracow (PL)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 0 days.

(21) Appl. No.: 15/841,224

(22) Filed: Dec. 13, 2017

(65) Prior Publication Data

US 2018/0209506 A1 Jul. 26, 2018

Related U.S. Application Data

(60) Provisional application No. 62/449,640, filed on Jan. 24, 2017.

(51) Int. Cl.
*F16F 9/348* (2006.01)
*F16F 9/34* (2006.01)
(Continued)

(52) U.S. Cl.
CPC .............. *F16F 9/341* (2013.01); *B60G 13/08* (2013.01); *F16F 9/185* (2013.01); *F16F 9/3484* (2013.01);
(Continued)

(58) Field of Classification Search
CPC ........ F16F 9/3484; F16F 9/3487; F16F 9/348; F16F 9/3488; F16F 9/3485; F16F 9/3482; F16F 9/3257; F16F 9/516
(Continued)

(56) References Cited

U.S. PATENT DOCUMENTS 3,003,594 A * 10/1961 Bourcie De Carbon .................... F16F 9/3484
188/317
3,756,357 A 9/1973 Graff et al.
(Continued)

FOREIGN PATENT DOCUMENTS

CN 20428297 U 4/2015
CN 105308350 A 2/2016
(Continued)

OTHER PUBLICATIONS

Extended European Search Report dated Jun. 8, 2018 for counterpart European Patent Application No. EP18151183.3, Eight Pages.
(Continued)

*Primary Examiner* — Bradley T King
*Assistant Examiner* — Stephen M Bowes
(74) *Attorney, Agent, or Firm* — William H. Honaker; Dickinson Wright PLLC

(57) ABSTRACT

Disclosed is a motor vehicle twin-tube damper comprising: a tube filled with a working liquid, a piston assembly disposed slidably inside the tube divides the tube into a rebound chamber and a compression chamber. A compensation chamber is located outside of the tube. A base valve assembly including a rebound valve assembly and a compression valve assembly controls the flow of the working liquid between the compensation chamber and the compression chamber. The rebound valve assembly includes a number of rebound flow channels covered by a main deflective disc. To suppress vibrations generated by the deflective disc due to pressure fluctuations occurring during rapid changes of the damper stroke direction, the rebound valve assembly includes an additional deflective disc disposed over the main deflective disc and separated from it by an annular gap with
(Continued)

a thickness (G) that is less than the thickness of the main deflective disc.

5 Claims, 5 Drawing Sheets

(51) Int. Cl.
*F16F 9/18* (2006.01)
*B60G 13/08* (2006.01)
*F16F 9/512* (2006.01)
*F16F 9/516* (2006.01)

(52) U.S. Cl.
CPC .............. *F16F 9/512* (2013.01); *F16F 9/516* (2013.01); *B60G 2200/17* (2013.01); *B60Y 2306/09* (2013.01); *F16F 2228/04* (2013.01); *F16F 2230/16* (2013.01)

(58) Field of Classification Search
USPC .......... 188/322.14; 137/854, 516.13, 516.15, 137/516.17
See application file for complete search history.

(56) References Cited

U.S. PATENT DOCUMENTS

| | | | |
|---|---|---|---|
| 5,042,624 A | | 8/1991 | Furuya et al. |
| 5,529,154 A | | 6/1996 | Tanaka |
| 6,155,391 A | * | 12/2000 | Kashiwagi .............. F16F 9/348 188/266.6 |
| 2008/0121478 A1 | | 5/2008 | Maniowski et al. |
| 2011/0031077 A1 | | 2/2011 | Slusarczyk et al. |
| 2011/0186393 A1 | | 8/2011 | Maeda et al. |
| 2012/0292147 A1 | | 11/2012 | Bombrys et al. |
| 2015/0167774 A1 | | 8/2015 | Kiyonaga |
| 2015/0247545 A1 | | 9/2015 | Anderson |
| 2015/0260253 A1 | | 9/2015 | Slusarczyk et al. |
| 2015/0316117 A1 | | 11/2015 | Kim |

FOREIGN PATENT DOCUMENTS

| | | | | |
|---|---|---|---|---|
| DE | 1282391 B | | 11/1968 | |
| DE | 2727407 A1 | | 1/1979 | |
| DE | 4139746 A1 | | 6/1993 | |
| DE | 4139746 A1 | * | 6/1993 | .............. F16F 9/348 |
| DE | 10318018 | | 12/2003 | |
| DE | 102008042251 | | 4/2010 | |
| DE | 102012214713 A1 | * | 2/2014 | .............. F16F 9/3485 |
| EP | 1172580 A1 | * | 1/2002 | .............. F16F 9/348 |
| EP | 1686284 | | 8/2006 | |
| EP | 1906046 A1 | * | 4/2008 | .............. F16F 9/348 |
| EP | 1906046 A1 | | 4/2008 | |
| FR | 2661726 | | 11/1991 | |
| FR | 2866688 | | 8/2005 | |
| GB | 2347728 | | 5/2000 | |
| JP | 5442570 A | | 4/1979 | |
| JP | 54042570 A | * | 4/1979 | ................ F16F 9/44 |
| JP | S55-102440 | | 7/1980 | |
| JP | 5824632 A | | 2/1983 | |
| JP | 58024632 A | * | 2/1983 | .............. F16F 9/344 |
| JP | 6078127 | | 5/1985 | |
| JP | 04185929 | | 7/1992 | |
| JP | 10220515 | | 8/1998 | |
| WO | 2005045277 | | 5/2005 | |

OTHER PUBLICATIONS

First Office Action and search report dated Mar. 20, 2019 for counterpart Chinese patent application No. 201711455541.3, along with machine EN translation downloaded from EPO.
Second Office Action and Search Report dated Sep. 16, 2019 for counterpart Chinese patent application No. 201711455541.3, along with machine EN translation downloaded from EPO.

* cited by examiner

TWIN-TUBE HYDRAULIC DAMPER WITH A VIBRATION SUPPRESSING DEVICE

RELATED APPLICATIONS

The present application claims the benefit of U.S. Provisional Application No. 62/449,640 filed on Jan. 24, 2017.

STATEMENT REGARDING FEDERALLY SPONSORED RESEARCH

None.

TECHNICAL FIELD

The present invention relates generally to a twin-tube hydraulic damper, in particular to a damper having a rebound valve assembly with improved noise reduction especially at low vehicle speeds.

BACKGROUND OF THE INVENTION

Twin-tube hydraulic damper assemblies in motor vehicle suspension environments are subject to many different types of stress and highly variable amplitudes and frequencies of compression and rebound. High frequency vibrations of the piston rod inside a typical twin-tube assembly can result in rattling, rambling, and knocking noises and when the damper is a part of a vehicle suspension system, these vibrations may be audible even inside the passenger compartment. The rattling noise intensity and occurrence depends on the particular vehicle suspension setup and the acoustic performance of the vehicle chassis. Nevertheless, these noises occur mainly at low amplitude, high frequency damper stroke reversals which occur, for example, while driving over a road paved with setts, also called Belgian blocks, with relatively low speeds of around 12 to 25 miles per hour (20-40 km/h). The most irritating rattling noise occurs at a piston rod vibration frequency within the range of 300-600 Hz. Poor isolation parameters of the vehicle chassis and a top mount at the end of the piston rod, as well as a low level of a background noise related to the low vehicle speeds at which this rattling noise occurs additionally makes it hard for vehicle drivers and passengers to ignore The present inventors have discovered that these vibrations are generated by a deflective disc of a rebound base valve assembly due to pressure fluctuations occurring, in particular, during rapid changes of the stroke direction of the piston.

Therefore, it is an object of the present invention to provide a twin-tube hydraulic damper in which these vibrations would be significantly suppressed and consequently the rattling noise they produce would be significantly decreased. It is also desirable to accomplish this object in a cost efficient and simple to manufacture method.

The prior art discloses other solutions providing improvements of acoustic performance of hydraulic dampers. Publication US2012292147, for example, discloses a twin tube damping mechanism having a piston body provided with a base valve assembly having an additional deflective disc named a velocity sensitive valve separated by a spacer from the main deflective disc. This velocity sensitive valve disc defines a plurality of slots or apertures which allow the flow of fluid when the velocity sensitive valve disc is in its closed position. Various kinds of other noise and vibration suppressing arrangements provided on damper piston assemblies are disclosed, for example, in publications U.S. Pat. No. 5,813,500, DE2727407, GB2347728, US2015247545, DE102008042251 and JPH10220515.

SUMMARY OF THE INVENTION

The present invention relates to a twin-tube hydraulic damper, in particular, a motor vehicle suspension damper comprising a tube filled with a working liquid and a piston assembly disposed slidably inside the tube, thereby dividing the tube into a rebound chamber and a compression chamber, with the piston assembly attached to a piston rod which is led outside the damper through a sealed piston rod guide. A compensation chamber is located outside of the tube, and a base valve assembly is located at an end of the compression chamber, wherein the base valve assembly comprises a rebound valve assembly and a compression valve assembly to control a flow of the working liquid between the compensation chamber and the compression chamber respectively during rebound and compression strokes of the damper. The rebound valve assembly is provided with a main deflective disc cooperating with a seat of a base valve body, which is provided with an annular protrusion distanced from the inner surface of the tube, and normally covering the flow channels of the base valve body. The rebound valve assembly is also provided with an additional deflective disc disposed over the main deflective disc and separated from the main deflective disc by an axial annular gap having a thickness that is equal to or less than the thickness of the main deflective disc. Preferably, the thickness of the annular gap is equal to or greater than 40% of the thickness of the main deflective disc. Most preferably, the thickness of the annular gap is within the range of from 0.18 to 0.4 millimeters (mm) in thickness. Preferably the additional deflective disc has a radius that is equal to a radius of the main deflective disc. Preferably the thickness of the additional deflective disc is greater than or equal to the thickness of the main deflective disc. Most preferably, the additional deflective disc has the same thickness as the thickness of said main deflective disc. Preferably, the rebound valve assembly is provided with a spacer separating the main deflective disc from the additional deflective disc and defining the annular gap. Preferably, the additional deflective disc is provided with a number of axial through openings. A thin film of the working liquid in the axial annular gap between the main deflective disc and the additional deflective disc introduces a stiction force, thereby dissipating energy of the rebound valve assembly oscillations which muffles the irritating rattling noise. As known to those of skill in the art, the term "stiction" is a portmanteau of "static friction". The efficiency of the dissipation is proportional to the relative axial velocity between the main and additional deflective discs and therefore to the stiffness of the additional deflective disc, as more energy is dissipated by the radial flow of the working liquid. The choice of the stiffness and dimensions of the additional deflective disc, as well as the gap width between the main deflective disc and additional deflective disc provide tuning parameters that may be used to reduce the amplitude and frequency of the rebound valve assembly oscillations. It is also beneficial that no substantial modifications of the damper are required to implement the present invention.

BRIEF DESCRIPTION OF THE DRAWINGS

The invention shall be described and explained below in connection with the attached drawings on which.

DETAILED DESCRIPTION OF PREFERRED EMBODIMENTS

Figure 1:
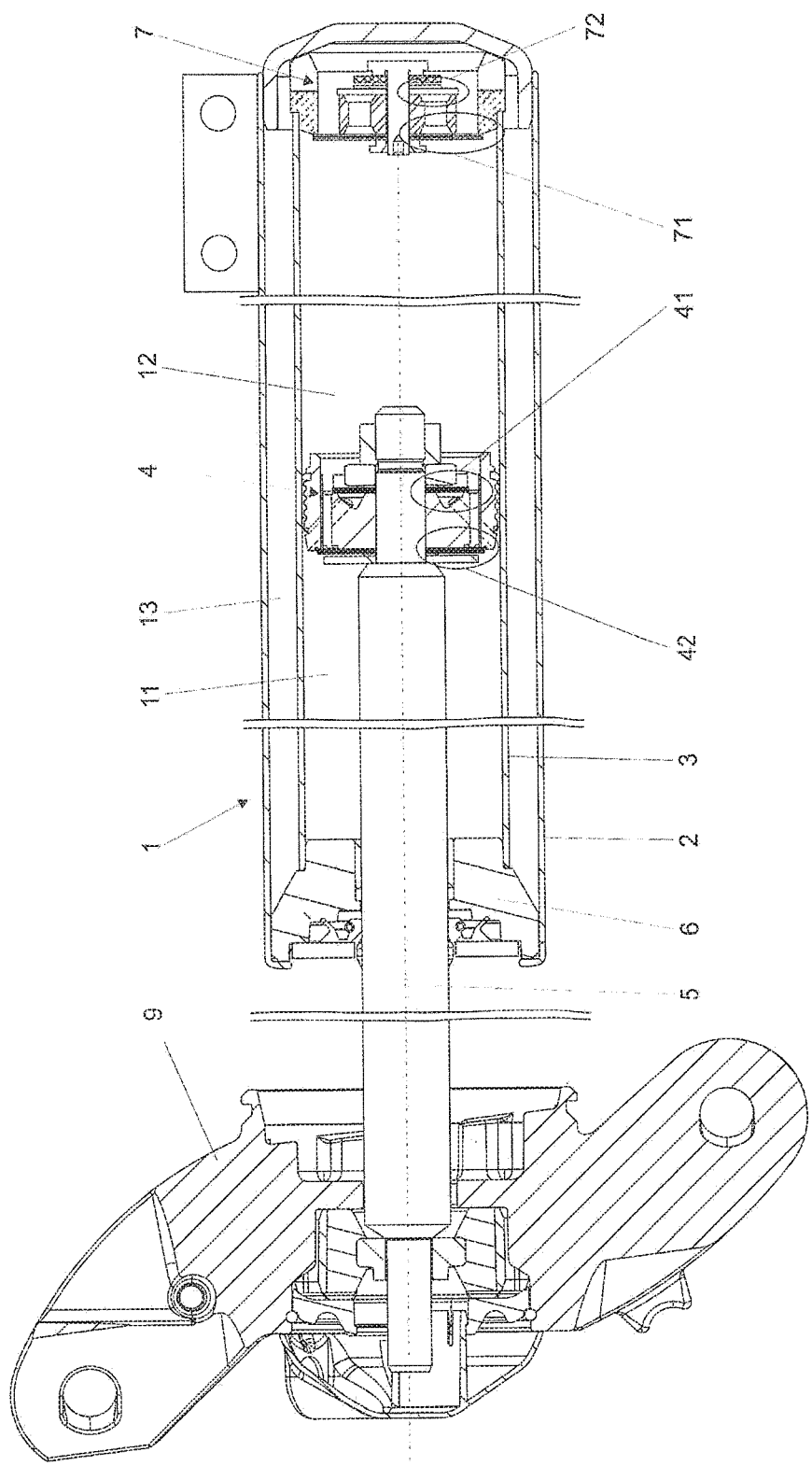
FIG. 1 is a schematic cross-sectional view of a twin-tube damper in accordance with the present invention.
Figure 6:
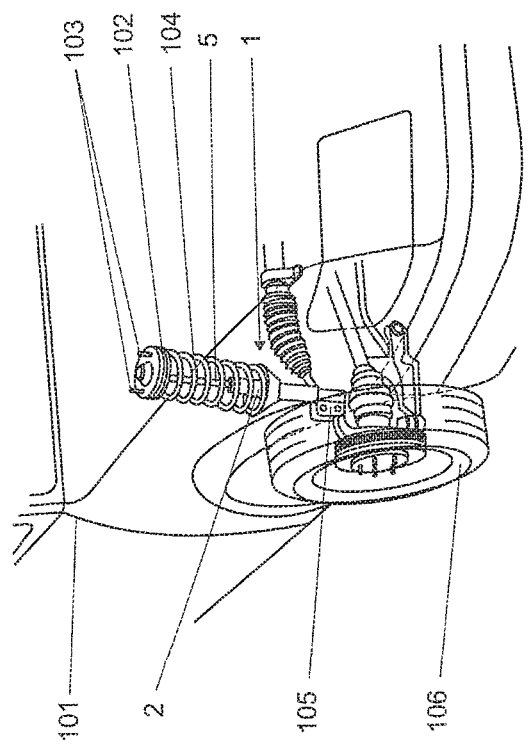
FIG. 6 illustrates a fragment of a vehicle suspension comprising the damper according to the present invention shown in FIG. 1.

Illustrated in FIG. 1 is an embodiment of a twin-tube damper 1 according to the present invention that may be employed in a typical motor vehicle suspension as shown in FIG. 6. The damper 1 comprises an external tube 2 and a main tube 3 filled with a viscous working liquid. Inside the main tube 3 a movable piston assembly 4 is attached to one end of a piston rod 5 which is led outside the damper 1 through a sealed piston rod guide 6. A top mount 9 is fixed to the other end of the piston rod 5. The damper 1 is also provided with a base valve assembly 7 fixed at an end of the main tube 3. The piston assembly 4 makes a sliding fit with an inner surface of the main tube 3 and divides the main tube 3 into a rebound chamber 11, located between the piston rod guide 6 and the piston assembly 4, and a compression chamber 12, located between the piston assembly 4 and the base valve assembly 7. A compensation chamber 13 is located at the other side of the base valve assembly 7 in the space between the main tube 3 and the external tube 2.

The piston assembly 4 is provided with a compression valve assembly 42 and a rebound valve assembly 41 to control a flow of the working liquid passing through the piston assembly 4 between the rebound chamber 11 and the compression chamber 12 while the piston assembly 4 is in motion. The base valve assembly 7 is also provided with a rebound valve assembly 71 and a compression valve assembly 72 to control a flow of working liquid passing through the base valve assembly 7 between the compensation chamber 13 and the compression chamber 12, respectively during rebound and compression strokes of the damper 1.

Figure 2:
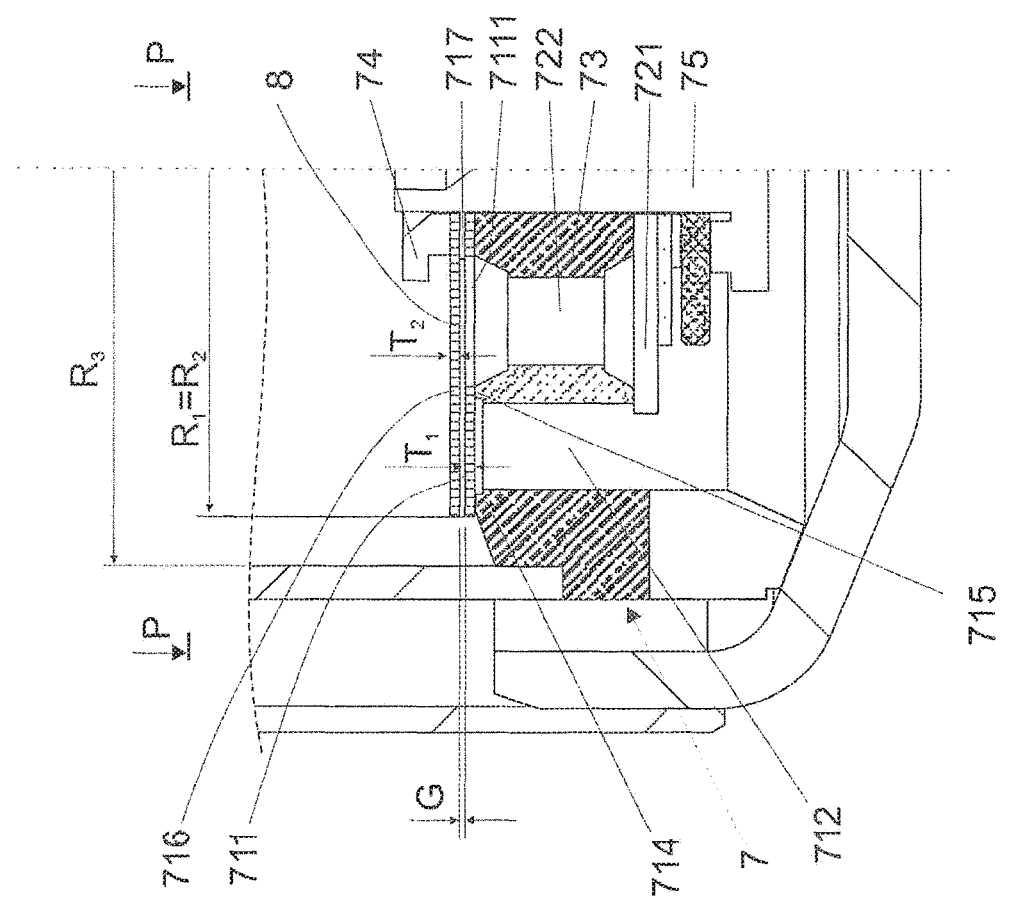
FIG. 2 is an enlarged axial cross-sectional view of a base valve assembly shown in FIG. 1.
Figure 3:
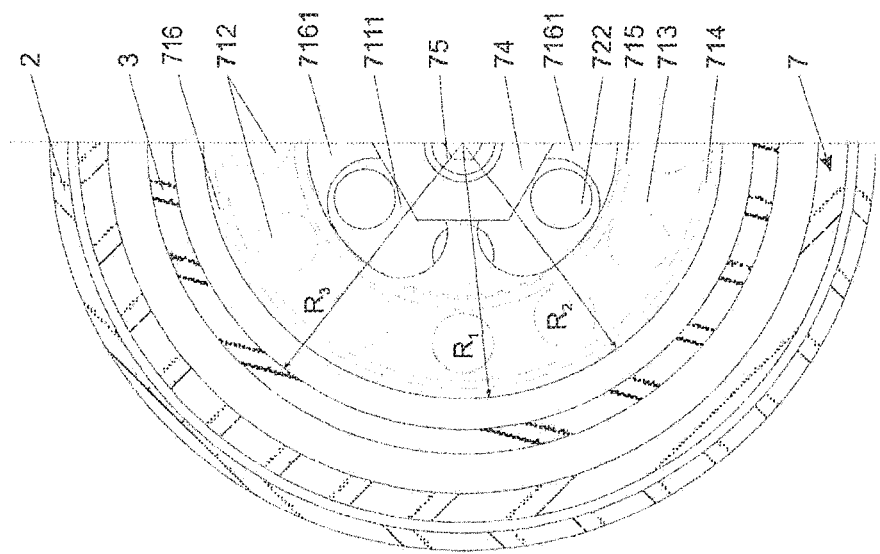
FIG. 3 is an enlarged cross-sectional view of the base valve assembly shown in FIG. 1 along the plane P-P shown in FIG. 2.

As shown in FIG. 2 and FIG. 3 the compression valve assembly 72 of the base valve assembly 7 comprises a stack of resilient deflective discs 721 covering a number of equiangularly spaced compression flow channels 722 formed in a body 73 of the base valve assembly 7. The rebound valve assembly 71 in turn comprises a resilient main deflective disc 711 covering a number of equiangularly spaced rebound flow channels 712 formed in the body 73 which are radially external with respect to the compression flow channels 722 as is shown.

At the outlets of the rebound flow channels 712 an annular recessed seat 713 is formed in the body 73 enabling for a fluid communication of the outlets of these channels 712 while covered by the disc 711 and equalizing the pressure of the working liquid acting on the disc 711 during the rebound stroke. The seat 713 is surrounded at its radially external side by an annular protrusion 714 and at its radially internal side by a second annular protrusion 715.

In order to dissipate the energy of the rebound valve assembly 7 oscillations during damper 1 operation, the base valve assembly 7 further comprises an additional deflective disc 716 that is located above the main deflective disc 711 and separated from it by a spacer 717 which defines an annular damping gap 8 between the discs 711 and 716.

Radially internal areas of the discs 711, 716 and 721, as well as the spacer 717 are clamped together by a bolt 75 passing through a central opening of the body 73 and secured in the compression chamber 12 by a threaded shoulder nut 74 screwed on an external thread of the bolt 75.

In this embodiment, the radii $R_1$ and $R_2$ of the discs 711 and 716 are the same and are about 14.5 mm. Furthermore both discs 711 and 716 have the same thicknesses $T_1$ and $T_2$ of about 0.4 mm. Preferably, the additional deflective disc 716 has a thickness that is equal to or greater than that of the thickness of the main deflective disc 711. The thickness of the spacer 717 and thus also the thickness G of the annular damping gap 8 amounts about 0.2 mm. The internal radius $R_3$ of the damper tube 3 is about 16.01 mm. Preferably the thickness, G, of the annular gap 8 is greater than or equal to 40% of the thickness of the main deflective disc 711. Most preferably, the thickness of G is from 0.18 to 0.4 mm in thickness.

In order to provide an inflow of the working liquid to the compression flow channels 722 to deflect the compression discs 721 during a compression stroke of the damper 1, the main deflective disc 711 of the rebound valve assembly 71 is provided with a plurality of, preferably two, kidney-shaped through openings 7111 in the area of the compression flow channels 722. Similarly the additional deflective disc 716 is provided with a plurality of, preferably two, kidney-shaped through openings 7161 in the area of the compression flow channels 722 rotated by 90° (degrees) with respect to the openings 7111 of the main deflective disc 711 so that the openings 7111 and 7161 partially overlap.

Obviously the gap 8 shape and size provide tuning parameters that may be used to reduce the amplitude and frequency of the disc 711 oscillations.

Figure 5:
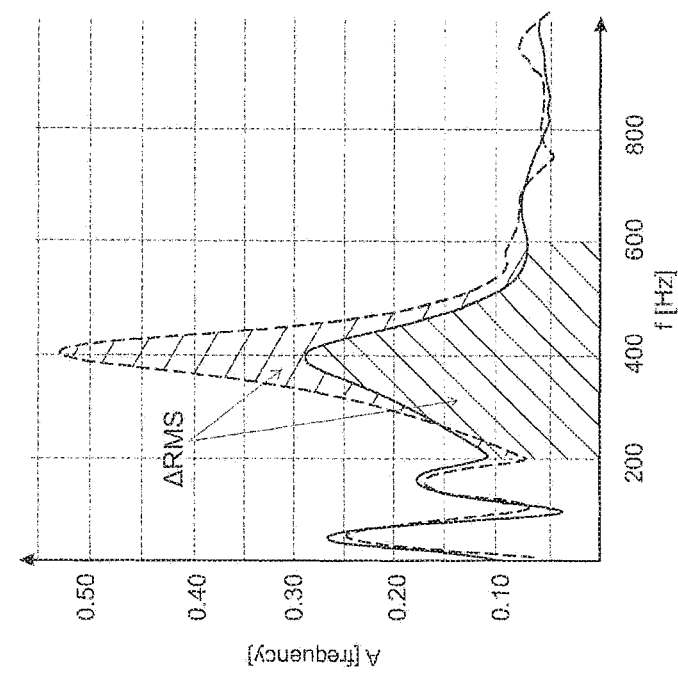
FIG. 5 is a graph illustrating piston rod acceleration amplitude vs. piston rod vibrations frequency corresponding to FIG. 4, the damper according to the present invention shown in the solid line and the prior art damper shown in the dotted line.
Figure 4:
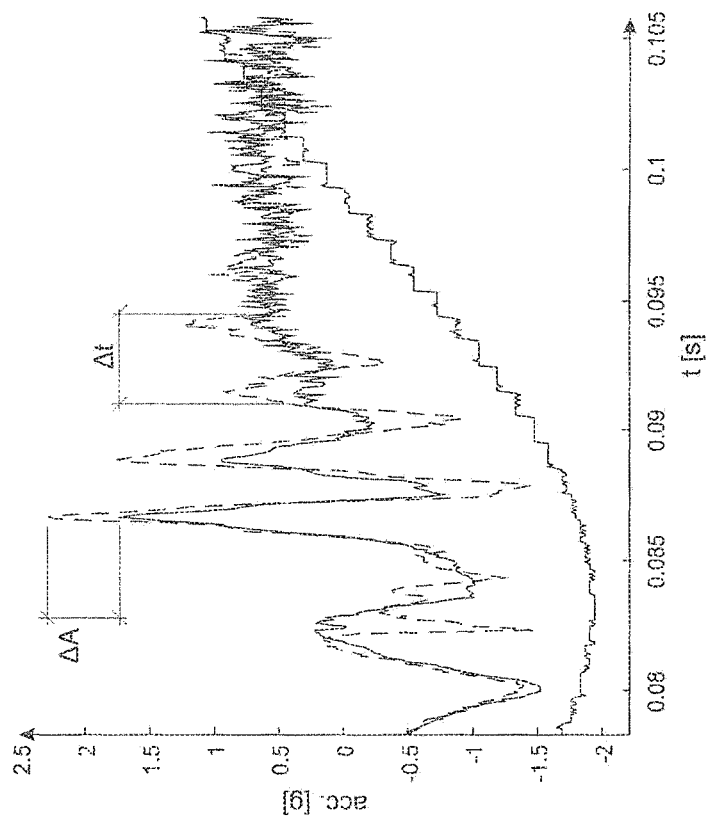
FIG. 4 is a graph illustrating the piston rod acceleration of the damper according to the present invention as shown in FIG. 1, shown in the solid line, as compared to a typical prior art damper, shown in the dotted line.

The damper 1 according to the present invention has been examined in tests involving measuring the acceleration of the piston rod 5 undergoing sinusoidal excitation as shown in FIG. 4. The measurements have been then analyzed in a time domain and transformed to a frequency domain using Fast Fourier Transformation (FFT) as shown in FIG. 5. In both FIG. 4 and FIG. 5 the results from the damper designed in accordance with the present invention are shown in the solid line, while the results from a prior art damper not in accordance with the present invention in that it did not include the gap 8 (G) or the additional deflective disc 716 are shown in the dotted lines.

The tests, as shown in FIG. 4 and FIG. 5, proved that the annular damping gap 8 and additional deflective disc 716 according to the present invention, provides substantial improvements over the similar damper devoid of the annular damping gap 8 and consequently the rattling noise produced during high frequency damper stroke reversals is significantly decreased. More precisely, having the annular gap 8 provided: a significant reduction (ΔA) of the maximal acceleration amplitude of up to about 25.2%; a significant reduction (Δt) of the duration of the periodic oscillations; and a significant reduction (ARMS) of the Root Mean Square (RMS) acceleration values within the 200-600 Hz frequency range of up to 37.9%. This is the frequency range in which the most irritating rattling noise occurs.

In FIG. 6 a schematic illustration of a fragment of an exemplary vehicle suspension is shown comprising the damper 1 of the present invention attached to a vehicle chassis 101 by means of a top mount 102 and a number of screws 103 disposed on the periphery of the upper surface of the top mount 102. The top mount 102 is connected to a coil spring 104 and a piston rod 5 of the hydraulic damper 1 of the present invention. The tube 2 of the damper 1 is connected to the steering knuckle 105 supporting the vehicle wheel 106.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

We claim:

1. A twin-tube hydraulic damper for a motor vehicle suspension, comprising:
    a tube filled with a working liquid;
    a piston assembly disposed slidably inside said tube, dividing said tube into a rebound chamber and a compression chamber and attached to a piston rod which is led outside said damper through a sealed piston rod guide;
    a compensation chamber located outside of said tube;
    a base valve assembly located at one end of said compression chamber, wherein said base valve assembly comprises a rebound valve assembly and a compression valve assembly to control a flow of said working liquid between said compensation chamber and said compression chamber respectively during a rebound stroke and a compression stroke of said damper; and
    said rebound valve assembly provided with a plurality of rebound flow channels covered by a main deflective disc, said rebound valve assembly further provided with an additional deflective disc disposed over said main deflective disc and separated from said main deflective disc by an annular gap having a thickness (G) that is less than or equal to a thickness of said main deflective disc,
    wherein said additional deflective disc has an outer radius (R2) that is equal to an outer radius (R1) of said main deflective disc,
    wherein said rebound valve assembly is provided with a spacer separating said main deflective disc from said additional deflective disc, and the spacer has a radius less than that of said main deflective disc and said additional deflective disc, and defines said annular gap between said main deflective disc and said additional deflective disc, and
    wherein the thickness (G) of the annular gap is constant and equal to a thickness of the spacer.

2. The twin tube hydraulic damper according to claim 1, wherein said thickness (G) of said annular gap is greater than or equal to 40% of said thickness of said main deflective disc and less than or equal to said thickness of said main deflective disc.

3. The twin tube hydraulic damper according to claim 1, wherein said thickness (G) of said annular gap (8) is within a range of from 0.18 mm to 0.4 mm.

4. The twin tube hydraulic damper according to claim 1, wherein a thickness (T2) of said additional deflective disc is greater than or equal to a thickness (T1) of said main deflective disc.

5. The twin tube hydraulic damper according to claim 1, wherein said additional deflective disc is provided with a plurality of axial through openings.

* * * * *